United States Patent [19]
Smith et al.

[11] Patent Number: 4,852,517
[45] Date of Patent: * Aug. 1, 1989

[54] INSECT TRAPPING MAT

[76] Inventors: Dwight L. Smith, Box 4364, Fullerton, Calif. 92634; Marvin Elkins, 1600 Colfax, Lemon Grove, Calif. 92020

[*] Notice: The portion of the term of this patent subsequent to Mar. 17, 2004 has been disclaimed.

[21] Appl. No.: 26,534

[22] Filed: Mar. 16, 1987

Related U.S. Application Data

[63] Continuation-in-part of Ser. No. 764,323, Aug. 12, 1985, Pat. No. 4,649,861.

[51] Int. Cl.⁴ .............................................. A01K 1/015
[52] U.S. Cl. ........................................... 119/1; 119/156
[58] Field of Search ........................... 119/1, 106, 156; 43/114, 115, 116, 136; 5/417, 420

[56] References Cited

U.S. PATENT DOCUMENTS

| 69,376 | 10/1987 | Walton | 119/1 |
| 2,032,248 | 2/1936 | Bins | 119/1 |
| 2,081,334 | 5/1937 | Kickenbush | 5/420 X |
| 2,775,222 | 11/1954 | Kruck | 119/1 |
| 3,066,646 | 12/1962 | Bramley | 119/1 |
| 3,173,398 | 3/1965 | Raymond | 119/1 |
| 3,284,273 | 11/1966 | Prentice | 119/1 |
| 3,565,040 | 2/1971 | Pohl | 119/1 |
| 4,169,428 | 10/1979 | Waugh | 119/1 |
| 4,649,861 | 3/1987 | Elkins et al. | 119/1 |

Primary Examiner—Gene Mancene
Assistant Examiner—R. Thomas Price
Attorney, Agent, or Firm—Plante, Strauss & Vanderburgh

[57] ABSTRACT

There is disclosed an insect trapping mat for domestic animals. The mat has a predetermined shape and is formed from a top layer, a bottom layer, and an intermediate layer. The top layer is insect pervious to allow insects such as fleas and ticks to travel into the intermediate layer. A wet or slow drying adhesive is located either on the bottom surface of the top layer, on the top surface of the bottom layer, or in the intermediate layer. The adhesive may be mixed with pheromones or bait to attract insects or fleas. Once the insects have touched the adhesive they will not be able to release themselves from it.

13 Claims, 3 Drawing Sheets

INSECT TRAPPING MAT

BACKGROUND OF THE INVENTION

This application is a continuation in part of our application of 08/12/85, Ser. No. 764323, now U.S. Pat. No. 4,649,861.

The invention relates to mats for animals and more specifically to mats designed to control the spread of insects such as fleas and ticks. In our application Ser. No. 764323 filed Aug. 12, 1985, a variety of such mat constructions were described wherein the mat has an upper, insect-pervious layer to permit the entry of insects into the mat interior and their volitional movement into the mat interior is unimpeded, while the simultaneous entry of hair, down and skin is precluded by the use of an intermediate layer means constructed of open cell foam. The pore size of the foam is chosen as a compromise between the density required to support the weight of an animal without making the mat unduly thick, more weight or thinner mats calling for higher densities and smaller pores, and the necessity of providing pores large enough to facilitate the entry of the insects to be controlled. Adhesive means are provided intermediate the upper pervious layer and a lower impervious layer affix the insects and their eggs, precluding reproduction and subsequent infestation.

The device of our present invention is a modification of that of our prior application in that rather than employing open cell foam, other types of intermediate and pervious layers are employed.

It is therefore an object of this invention to provide for an improved animal mat or cushion that will provide for the immobilization of insects without the use of chemical insecticides and repellents.

It is a further object of this invention to provide for a mat that is thinner and more rigid than mats made from open-cell foam.

It is a further object of this invention to provide which can be used as a vertical cushion or cage wall-covering.

It is a further object of this invention to provide a cushion for confined spaces and for very heavy animals.

SUMMARY OF THE PRESENT INVENTION

Pet mats and cage bedding materials provide a reservoir for the breeding of ectoparasites. One reason they do so is because the interstices for previously known mats and beddings provided such parasites shelter from light and the movement of the animal. Although attempts have been made to incorporate insecticides within such mats, as in Nichols, U.S. Pat. No. 4,008,668 to control such breeding, no widespread commercial acceptance of such mats has occurred, owing to the danger inherent in exposing animals constantly to insecticide vapors.

Our improved construction has been designed to entrap such ectoparasites while the animal's body is proximate without the use of insecticides. The mat has a pervious layer through which insects may enter. For purposes of discussing the improved mat, the term pervious is meant to convey the meaning that the material is so formed as to allow the volitional movement of the insect or flea, but does not lend itself to allowing the skin or hair of the animal to enter and pass through the material. The bottom layer would preferably be of an insect impervious material. The intermediate area between the top layer and the bottom layer has been designed to accommodate a non-drying or slow drying adhesive which would capture the insect instantly upon contact therewith. A variety of constructions are possible using this broad concept. Additionally, the adhesive could also be a substance to destroy or retard the development of larvae, flea eggs, pupae, and/or a substance to discourage chewing by the pet.

DESCRIPTION OF THE DRAWINGS

FIG. 13b is a partial cross-sectional view of the mat illustrated in FIG. 13a;

DESCRIPTION OF THE PREFERRED EMBODIMENT:

Applicant's improved device will be described by referring to FIGS. 1–15 of the drawings. The mat is generally designated as numeral 10.

Figure 1:
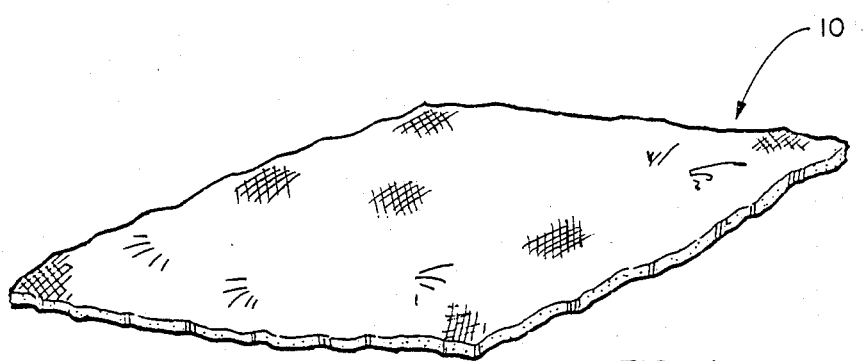
FIG. 1 is a perspective illustrating a househole pet lying on applicant's novel pet mat.
Figure 2:
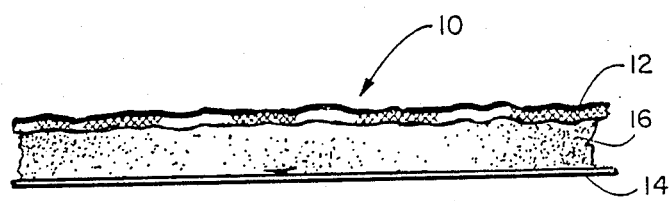
FIG. 2 is a partial cross-sectional elevation view illustrating the construction of the novel pet mat.
Figure 3:
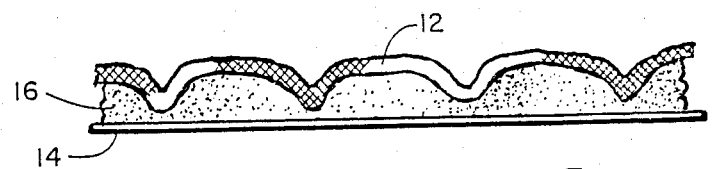
FIG. 3 is a variation in the configuration of the top layer of the pet mat illustrated in FIG. 2.

The first version of the mat is illustrated in FIG. 2. It has a top layer of insect pervious material such as DuPont Reemay polyester scrim 12. The bottom layer 14 would preferably be formed from an insect impervious material such as kraft paper, plastic, metal, wood, etc. The intermediate layer 16 would preferably be formed of BASF Enkamat, a non-woven nylon matting characterized by a plurality of interlocked fibers. The fibers would be coated with a non-drying or slow drying adhesive. Adhesion of the Enkamat to itself when so coated is largely precluded by its rigidity and resistance to deformation under high loads due to the interlocking of the fibers at a plurality of points along their length. The adhesive could be a long aging polymer adhesive exhibiting significant tack over several months time. Examples of such adhesives include 3M series 300 and 400 acrylic adhesives. In FIG. 3, the top layer has been formed into a quilted decorative formation by an embossing press.

Figure 4:
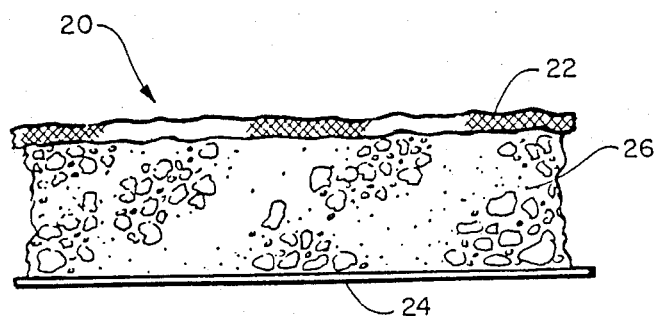
FIG. 4 is a partial cross-sectional view of a first alternative pet mat.

A first alternative version of the mat is designated numeral 20 and is illustrated in FIG. 4. It has a top layer 22 of an insect pervious material. Its bottom layer 24 would preferably be formed of a non-pervious material. The intermediate layer 26 would be in the form of a assymmetric construction of overlapped screens or scrims. One such construction is a stack of polypropylene mesh designated as Internet XN-6062, XN-3230, XN-1670, and XN-5010/18. Alternatively, a stack of DuPont Reemay spunbonded polyester scrims can be arranged to provide an asymmetric mesh that is either impregnated or covered with a nondrying or slow drying adhesive.

Figure 5:
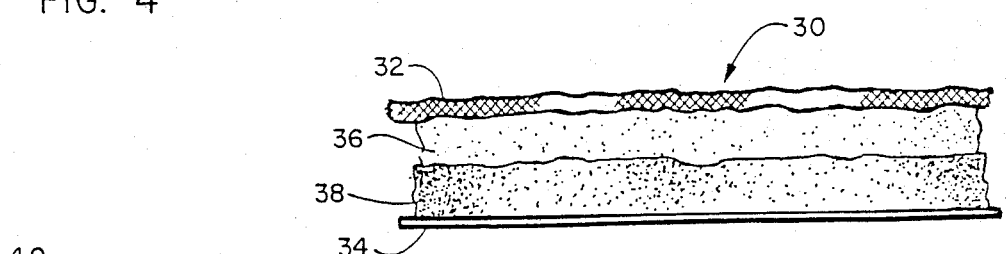
FIG. 5 is a partial cross-sectional view of a second alternative version of the pet mat.

A second alternative version of the pet mat is designated numeral 30 and is illustrated in FIG. 5. It has a top layer of insect pervious material 32 and a bottom layer preferably of nonimpervious insect material 34. A layer of dry open cell foam 36 and a layer of adhesive Enkamat 38 are positioned intermediiate the top and bottom layer.

Figure 6:
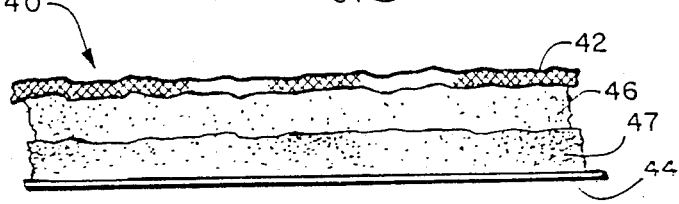
FIG. 6 is a partial cross-sectional view of a third alternative version of the pet mat.

In FIG. 6 a third alternative version of the pet mat is illustrated and identified by the numeral 40. It has a top layer of insect pervious material 42 and a bottom layer preferably of insect impervious material 44. Between the top layer of insect pervious material 42 and the bottom layer 44 is a layer of matted excelsior 46 which has been impregnated with adhesive. The adhesive is impregnated from the undersurface of layer 46, adjacent to the bottom layer 44 and pentrates to an intermediate level, indicated by line 47.

Figure 7:
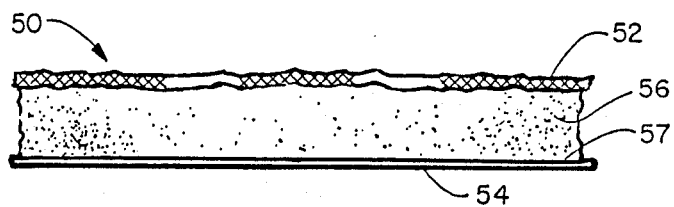
FIG. 7 is a partial cross-sectional view of a fourth alternative version of the pet mat.

In FIG. 7 a fourth alternative version of the pet mat is illustrated and designated by the numeral 50. It has a top layer of insect pervious material 52 and a bottom layer 54 preferably of insect impervious material. The intermediate layer 56 is formed from 3M Scotchbrite and a non-drying or slow drying adhesive 57 is applied to the top surface of bottom layer 54.

Figure 8:
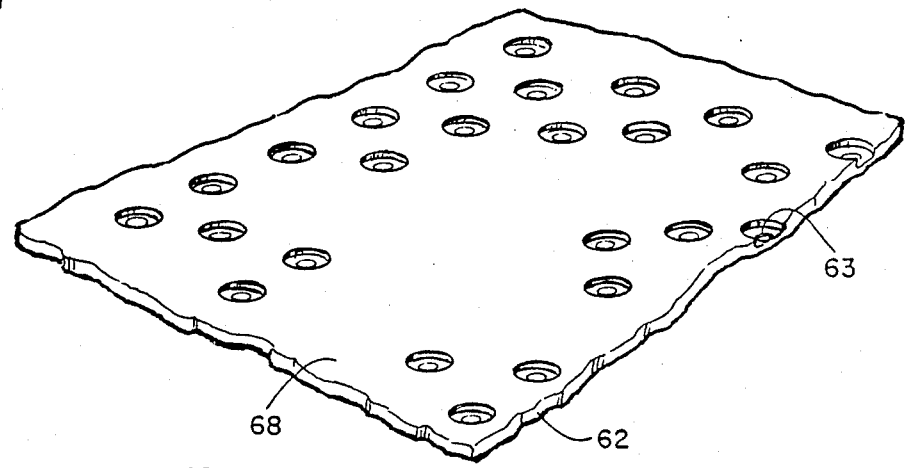
FIG. 8 is a perspective view of the bottom surface of the top layer of a fifth alternative version of the pet mat.
Figure 9:
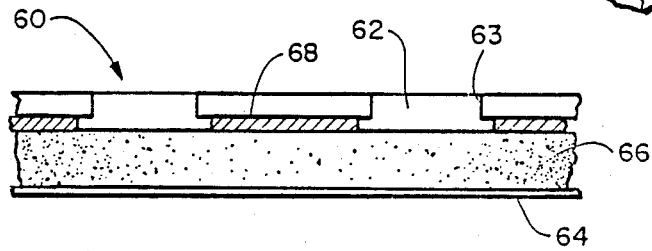
FIG. 9 is a partial cross-sectional view of the fifth alternative version of the pet mat.

A fifth alternative version of the pet mat is illustrated in FIGS. 8 and 9 and is generally designated numeral 60. It has a top layer 62 of insect impervious material having a predetermined number of apertures 63 therein. It has a bottom layer 64 preferably made from an insect impervious material. The intermediate layer is formed of plastic screen or scrim. The bottom surface of top layer 62 has a plurality of areas that are coated with a slow or non-drying adhesive 68. These spots are spaced away from the aperture 63 so that hair from the pet which enters the aperture 63 does not come in contact with the adhesive 68.

Figure 10:
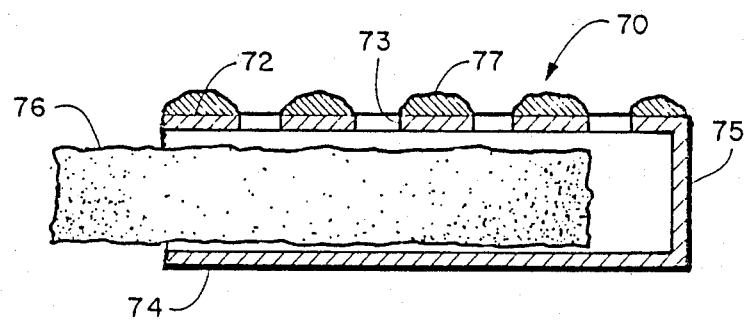
FIG. 10 is a partial cross-sectional view of a modified form of the fifth alternative version of the pet mat.

A modified form of the fifth alternative version of the novel pet mt is illustrated in FIG. 10 and is generally designated numeral 70. It has a top layer 72 of insect impervious material and a bottom layer 74 preferably of insect impervious material. Side walls 75 form a frame for the mat and an intermediate layer of styrofoam beads 76 that has been impregnated with a non-drying or slow drying adhesive may be inserted and removed from the frame of the mat. The top layer 72 has a predetermined pattern of apertures 73 and has cushion members 77 formed on its top surface.

Figure 11:
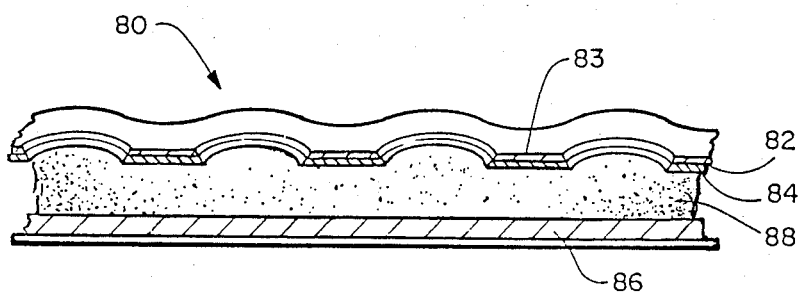
FIG. 11 is another modified version of the fifth alternative version of the pet mat.

Another modified version of the fifth alternative version of the novel mat is generally designated numeral 80 and is illustrated in FIG. 11. It has a top layer 82 of insect impervious material and has a predetermined arrangment of apertures 83 therein. The bottom surface of top layer 82 has a non-drying or slow drying adhesive coating 84 thereon. The bottom layer 86 is preferably of an insect impervious material and the interior layer 88 is DuPont Sontara Polyester Matting.

Figure 12:
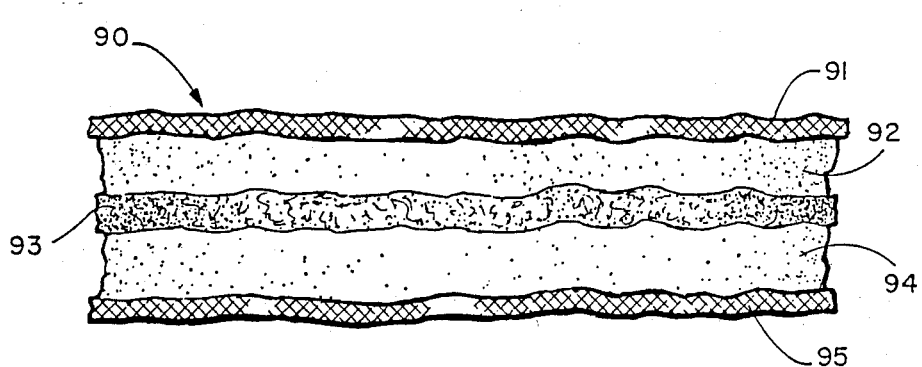
FIG. 12 is a partial cross-sectional view of a sixth alternative version of the pet mat.

A sixth alternative version of the pet mat is illustrated in FIG. 12 and it is generally designated numeral 90. It has a top layer 91 and bottom layer 95, both of insect pervious material. Layers 92 and 94 are formed of an open cell foam and they have a layer 93 between them of Enkamat partially saturated with adhesive. This pet mat has been designed so that it can be flipped over and used which should thereby double its useful life.

Figure 13A:
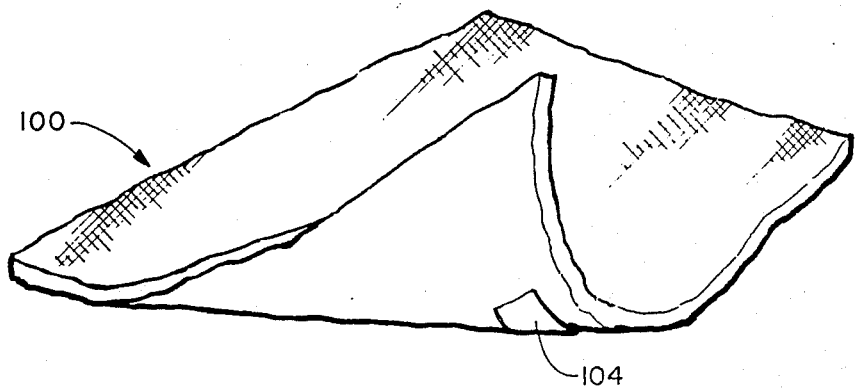
FIG. 13a is a perspective view of a modified version of the fourth alternative version of the pet mat.
Figure 13B:
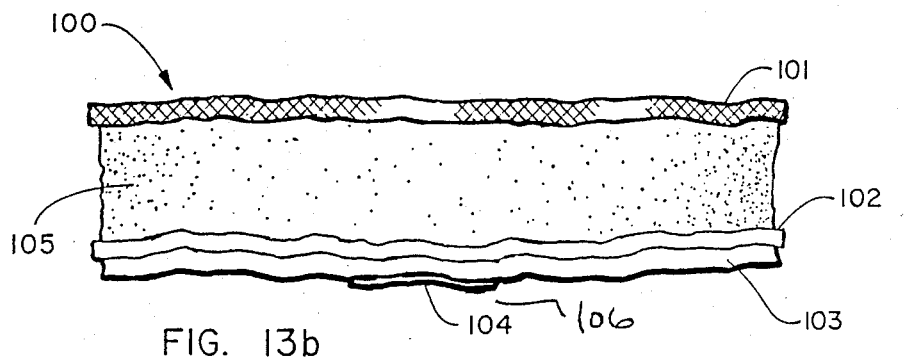
Figure 14:
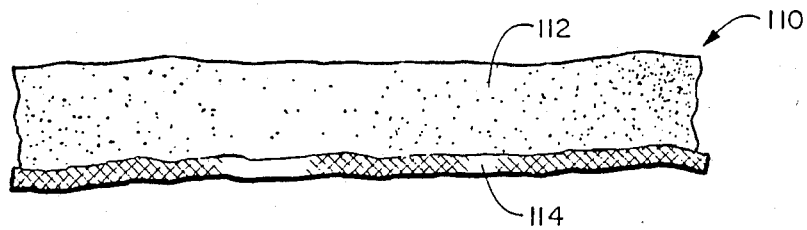
FIG. 14 is a partial cross-sectional view of a seventh alternative version of the mat.

FIGS. 13a and 13b illustrate a modified version of the fourth alternative version of the novel pet mat. The pet mat 100 has a top layer 101 of insect pervious material and a bottom layer 103 of insect impervious material. Bottom layer 103 would be made of a clear material so that it could be seen through and its top surface would be covered by a clear acrylic adhesive 102 that also could be seen through. A layer of open cell foam 105 would be intermediate the top and bottom layers. A color chart 104 would be printed on the bottom surface of bottom layer 103 along with a comparison dot made from an oxidation prone dye. Alternatively, such a dye could be incorporated into the adhesive 102. The remaining useful life of the mat could then be determined by comparing the color of the dot 106 or dyed adhesive 102 with the color chart, or by comparing the appearance of the clear adhesive 102 with the gray scale as it becomes darkened by the accumulation of insects and detritus. A seventh alternative version of the mat is illustrated in FIG. 14 and is designated numeral 110. It is designed to be used vertically or nearly vertically for animals to lay and rub against. It has a layer of Enkamat 112 and a bottom layer of insect impervious material 114. A coating of adhesive 113 would cover the top surface of bottom layer 114.

Figure 15:
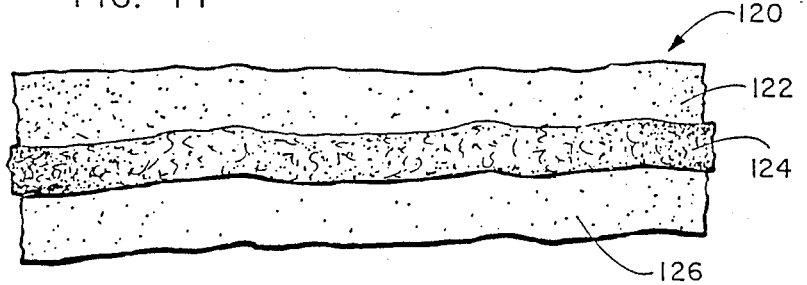
FIG. 15 is a partial cross-sectional view of an eighth alternative version of the mat.

An eighth alternative version of the mat is illustrated in FIG. 15 and is designated numeral 120. It has a top layer 122 and a bottom layer 126 of non-woven fabric such as 3M Scotchbrite or Dupont Sontra mesh. An intermediate layer 124 is formed of non-woven fabric or mesh that has been coated with adhesive. Such a construction is designed for use as a saddle mat.

What is claimed is:

1. A mat, having a generally planar shape and lying in a plane, for domestic animals comprising:
   a. a top layer of insect pervious material;
   b. a bottom layer;
   c. layer means intermediate said top layer and said bottom layer for resisting the deformation of the mat by forces normal to said plane and also mechanically obstructing the entry of the animal's hair, down or hide while allowing the movement of insects therethrough; and
   d. tack-adhesive means intermediate said top and bottom layers to cause the insects to self-adhere to it.

2. A mat for domestic animals having a predetermined shape comprising:
   a. a top layer of insect pervious material;
   b. a bottom layer;
   c. layer means intermediate said top and bottom layers selected from the group class consisting of non-woven and spunbonded fabrics, layers of woven screen fabrics, aggregates having interstices of a predetermined mean size, Enkamat soil-stabilization material, and matted non-woven excelsior or wood fibers;

d. and tack-adhesive means intermediate said top and bottom layers to cause insects to adhere to it.

3. A mast as recited in claim 2 further comprising insect attractants admixed with the adhesive of said self-adhesive means.

4. A mat as recited in claim 3 wherein said insect attractants include pheromones.

5. A mat as recited in claim 1 further comprising insect attractants admixed with the adhesive of said self-adhesive means.

6. A mat as recited in claim 5 wherein said insect attractants include pheromones.

7. A mat as recited in claim 1 wherein said layer means includes overlapped layers of polypropylene mesh.

8. A mat as recited in claim 1 wherein said layer means includes matted excelsior.

9. A mat as recited in claim 1 wherein said top layer is of insect impervious material and has a plurality of apertures for passage of insects, and wherein a layer of tack-adhesive is applied on the top surface of said lower layer at locations out of alignment with the apertures in said top layer.

10. A mat as recited in claim 1 wherein said top layer is of insect impervious material and has a plurality of apertures for passage of insects, and wherein said intermediate layer is formed of polystyrene foam beads which are impregnated with said tack-adhesive.

11. A mat as recited in claim 10 wherein said intermediate layer includes a frame with side walls to form a chamber for said polystyrene foam beads.

12. A mat as recited in claim 1 including a second layer of insect pervious material on an underside of said bottom layer, with a second intermediate layer therebetween, whereby said mat is reversible.

13. A mat as recited in claim 1 wherein said bottom layer is of a clear material permitting observation of appearance of an inside surface of said bottom layer to provide an indication of the useful life of the mat.

* * * * *